(12) United States Patent
Mitsutani

(10) Patent No.: US 10,328,804 B2
(45) Date of Patent: Jun. 25, 2019

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Noritake Mitsutani, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 262 days.

(21) Appl. No.: 15/340,105

(22) Filed: Nov. 1, 2016

(65) Prior Publication Data

US 2017/0043666 A1 Feb. 16, 2017

Related U.S. Application Data

(62) Division of application No. 14/409,605, filed as application No. PCT/IB2013/001754 on Aug. 12, 2013, now Pat. No. 9,895,979.

(30) Foreign Application Priority Data

Aug. 23, 2012 (JP) .................................. 2012-184176

(51) Int. Cl.
*B60L 1/00* (2006.01)
*B60L 3/00* (2019.01)
(Continued)

(52) U.S. Cl.
CPC ............... *B60L 11/02* (2013.01); *B60L 1/006* (2013.01); *B60L 3/0069* (2013.01); *B60L 3/04* (2013.01);
(Continued)

(58) Field of Classification Search
CPC .... B60L 11/123; B60L 11/14; B60L 11/1803; B60L 11/1818; B60L 11/1861;
(Continued)

(56) References Cited

U.S. PATENT DOCUMENTS 7,104,847 B2 9/2006 Sodemann et al.
7,482,704 B2 1/2009 Priem
(Continued)

FOREIGN PATENT DOCUMENTS

EP 1738947 A2 1/2007
JP 2000-234539 A 8/2000
(Continued)

OTHER PUBLICATIONS

Office Action dated Nov. 25, 2016 in U.S. Appl. No. 14/409,605.
(Continued)

*Primary Examiner* — Rexford N Barnie
*Assistant Examiner* — Toan T Vu
(74) *Attorney, Agent, or Firm* — Hunton Andrews Kurth LLP

(57) ABSTRACT

An ECU executes a program including: a step of setting a threshold β as a shutdown threshold when, during a power supply operation, a duration of a power supply stoppage exceeds a first time; a step of stopping an operation of an engine or prohibiting the engine from operating; and a step of executing system shutdown processing when an SOC of a storage apparatus falls to or below the shutdown threshold or the duration of the power supply stoppage exceeds a second time.

6 Claims, 8 Drawing Sheets

(51) Int. Cl.
*H02G 3/00* (2006.01)
*B60L 11/02* (2006.01)
*H02P 9/04* (2006.01)
*B60L 11/18* (2006.01)
*B60L 3/04* (2006.01)
*B60L 11/12* (2006.01)
*B60L 11/14* (2006.01)
*B60W 20/00* (2016.01)

(52) U.S. Cl.
CPC ............ *B60L 11/123* (2013.01); *B60L 11/14* (2013.01); *B60L 11/1803* (2013.01); *B60L 11/1818* (2013.01); *B60L 11/1861* (2013.01); *H02P 9/04* (2013.01); *B60L 2210/30* (2013.01); *B60L 2210/40* (2013.01); *B60L 2220/14* (2013.01); *B60L 2230/16* (2013.01); *B60L 2240/36* (2013.01); *B60L 2240/445* (2013.01); *B60L 2240/529* (2013.01); *B60L 2240/80* (2013.01); *B60L 2270/12* (2013.01); *B60L 2270/32* (2013.01); *B60L 2270/34* (2013.01); *B60W 20/00* (2013.01); *B60W 2530/12* (2013.01); *Y02T 10/6217* (2013.01); *Y02T 10/705* (2013.01); *Y02T 10/7005* (2013.01); *Y02T 10/7044* (2013.01); *Y02T 10/7077* (2013.01); *Y02T 10/7088* (2013.01); *Y02T 10/7241* (2013.01); *Y02T 90/127* (2013.01); *Y02T 90/128* (2013.01); *Y02T 90/14* (2013.01); *Y02T 90/163* (2013.01)

(58) Field of Classification Search
CPC .. B60L 1/006; B60L 2210/30; B60L 2210/40; B60L 2220/14; B60L 2230/16; B60L 2240/36; B60L 2240/445; B60L 2240/529; B60L 2240/80; B60L 2270/12; B60L 2270/32; B60L 2270/34; B60L 3/0069; B60L 3/04; B60W 20/00; B60W 2530/12; H02P 9/04; Y02T 10/6217; Y02T 10/7005; Y02T 10/7044; Y02T 10/705

USPC ........................................................ 307/10.1
See application file for complete search history.

(56) References Cited

U.S. PATENT DOCUMENTS

| | | |
|---|---|---|
| 7,550,861 B2 | 6/2009 | Oyobe et al. |
| 8,085,002 B2 | 12/2011 | Ayana et al. |
| 8,729,869 B2 | 5/2014 | Ayana et al. |
| 2002/0057582 A1 | 5/2002 | Nakayama et al. |
| 2005/0190512 A1 | 9/2005 | Sodemann et al. |
| 2006/0113798 A1 | 6/2006 | Oyobe et al. |
| 2008/0164850 A1 | 7/2008 | Ayana et al. |
| 2008/0169651 A1 | 7/2008 | Oyobe et al. |
| 2009/0102433 A1 | 4/2009 | Kamaga |
| 2010/0060093 A1 | 3/2010 | Hunter |
| 2014/0291994 A1 | 10/2014 | Hirasawa et al. |
| 2015/0318809 A1 | 11/2015 | Mitsutani |

FOREIGN PATENT DOCUMENTS

| | | |
|---|---|---|
| JP | 2000-308201 A | 11/2000 |
| JP | 2001-008380 A | 1/2001 |
| JP | 2002-374604 A | 12/2002 |
| JP | 2006-020455 A | 1/2006 |
| JP | 2006-121844 A | 5/2006 |
| JP | 2007-008349 A | 1/2007 |
| JP | 2009-083541 A | 4/2009 |
| JP | 2009-106053 A | 5/2009 |
| JP | 2012-007508 A | 1/2012 |
| JP | 2012-127318 A | 7/2012 |

OTHER PUBLICATIONS

US Patent and Trademark Office, Final Office Action in U.S. Appl. No. 14/409,605, dated Jun. 7, 2017, 18 pages.
US Patent and Trademark Office, Notice of Allowance in U.S. Appl. No. 14/409,605, dated Oct. 10, 2017, 11 pages.

VEHICLE AND CONTROL METHOD FOR VEHICLE

CROSS-REFERENCE TO RELATED APPLICATIONS

This is a divisional application based on U.S. patent application Ser. No. 14/409,605, filed Dec. 19, 2014, which is a national phase application based on the PCT International Patent Application No. PCT/IB2013/001754 filed Aug. 12, 2013, claiming priority to Japanese Patent Application No. 2012-184176 filed Aug. 23, 2012, the entire contents of which are incorporated herein by reference.

BACKGROUND OF THE INVENTION

1. Field of the Invention

The invention relates to a technique for supplying power from a power generation apparatus that uses an engine as a power source or power from a storage apparatus to a power supply subject outside a vehicle.

2. Description of Related Art

Japanese Patent Application Publication No. 2000-234539 (JP-2000-234539 A), for example, discloses a control apparatus for a hybrid vehicle that performs power generation using a generator by controlling an engine rotation speed such that an engine is driven at or above a predetermined catalyst activation temperature in a case where power is supplied to the outside of the vehicle from an external outlet.

SUMMARY OF THE INVENTION

In the hybrid vehicle disclosed in JP-2000-234539 A, the engine may be driven in order to maintain the catalyst activation temperature even when an amount of power used by a power supply destination is small or a device at the power supply destination is temporarily stopped during an intermittent operation, and as a result, fuel may be consumed wastefully.

The invention provides a vehicle and a control method for the vehicle with which an engine is controlled appropriately in accordance with an operating condition of a power supply destination.

A vehicle according to a first aspect of the invention includes: an engine; a storage apparatus capable of supplying power to a power supply subject outside the vehicle; a power generation apparatus capable of supplying power to the power supply subject using the engine as a power source; and a control apparatus configured to operate the engine in accordance with a condition of the vehicle during a power supply operation in which power is supplied to the power supply subject from at least one of the power generation apparatus and the storage apparatus. The control apparatus is configured to suppress an operation of the engine when a power supply remains continuously smaller than a predetermined value. The power supply is the power supplied to the power supply subject during the power supply operation.

In the vehicle, the control apparatus may be configured to stop the operation of the engine or prohibit the engine from operating when a duration of a condition in which the power supply is smaller than the predetermined value exceeds a first time.

In the vehicle, the control apparatus may be configured to stop a system of the vehicle that is activated during the power supply operation when the duration exceeds a second time, and the second time may be longer than the first time.

In the vehicle, the control apparatus may be configured to stop a system of the vehicle that is activated during the power supply operation when a remaining capacity of the storage apparatus falls below a threshold, and the threshold employed when the power supply remains continuously smaller than the predetermined value may be equal to or larger than the threshold employed when the power supply is larger than the predetermined value or when the duration is equal to or shorter than the first time.

In the vehicle, the control apparatus may be configured to permit the engine to operate when the power supply is equal to or larger than the predetermined value or when the duration is equal to or shorter than the first time.

In the vehicle, in a case where the power supply is equal to or larger than the predetermined value or a case where the duration is equal to or shorter than the first time, the control apparatus may be configured to permit the engine to operate when a remaining capacity of the storage apparatus falls below a threshold.

In the vehicle, in a case where the power supply is equal to or larger than the predetermined value or a case where the duration is equal to or shorter than the first time, the control apparatus may be configured to permit the engine to operate when a catalyst temperature of the engine falls below a threshold.

A second aspect of the invention relates to a control method for a vehicle. The vehicle includes an engine, a storage apparatus, and a power generation apparatus. The control method includes: operating the engine in accordance with a condition of the vehicle during a power supply operation in which power is supplied to a power supply subject outside the vehicle from at least one of the power generation apparatus and the storage apparatus, the power generation apparatus being capable of supplying power to the power supply subject using an engine as a power source, and the storage apparatus being capable of supplying power to the power supply subject; and suppressing an operation of the engine when a power supply remains continuously smaller than a predetermined value, the power supply being the power supplied to the power supply subject during the power supply operation.

According to the invention, the operation of the engine is suppressed when the power supply remains continuously smaller than the predetermined value during the power supply operation. Therefore, the operation of the engine is suppressed even when an operation of the engine is requested due to a reduction in the catalyst temperature or the like, for example. As a result, wasteful fuel consumption can be avoided. It is therefore possible to provide a vehicle and a control method for the vehicle with which an engine is controlled appropriately in accordance with operating conditions of a power supply destination.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below with reference to the drawings. In the following description, identical components have been allocated identical reference symbols. Names and functions thereof are also identical. Accordingly, detailed description of these components will not be repeated.

Figure 1:
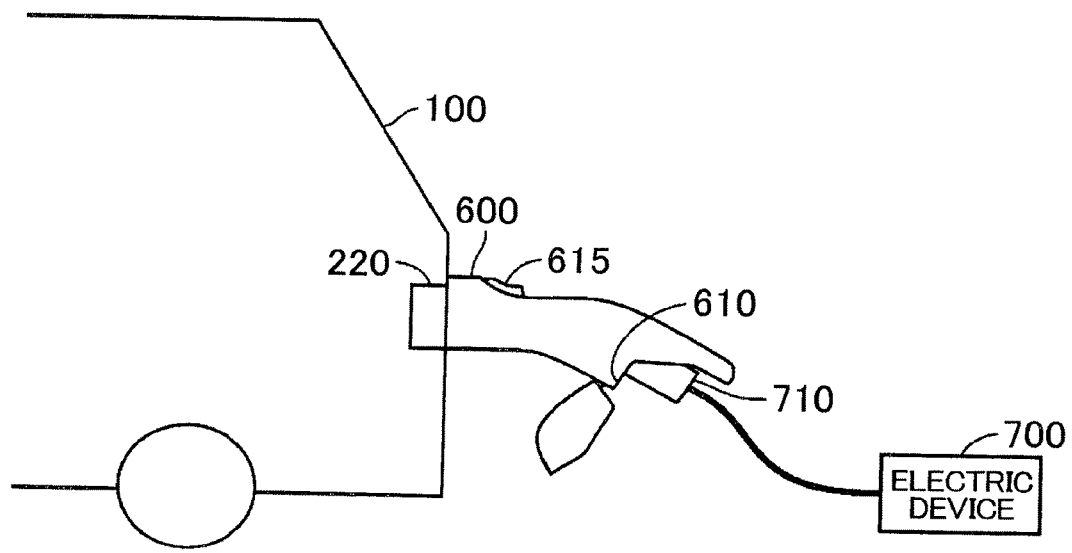
FIG. 1 is a view showing a power supply connector attached to a vehicle with an electric device connected thereto.

As shown in FIG. 1, a vehicle 100 is provided with an inlet 220. One end of a connector used exclusively for supplying power (to be referred to hereafter as a power supply connector) 600 that can be attached to and detached from the vehicle 100 is attached to the inlet 220. A socket 610 that can be connected to a plug 710 connected to a household electric device 700 (to be referred to simply as the electric device 700 hereafter) such as a rice cooker is provided on another end of the power supply connector 600.

When the power supply connector 600 is connected to the inlet 220 and the plug 710 of the electric device 700 is connected to the power supply connector 600, a power supply operation is executed in the vehicle 100. By executing the power supply operation, power from the vehicle 100 is supplied to the electric device 700 serving as a power supply subject via the inlet 220, the power supply connector 600, and the plug 710.

Hence, as a result of the power supply operation, the electric device 700 such as a rice cooker connected to the power supply connector 600 can be operated by power stored in a storage apparatus or the like of the vehicle 100 or power generated in a power generation apparatus, to be described below, which uses an engine as a power source.

The power supply connector 600 is provided with an operating member 615. The power supply connector 600 can be detached from the inlet 220 by pressing the operating member 615.

Figure 2:
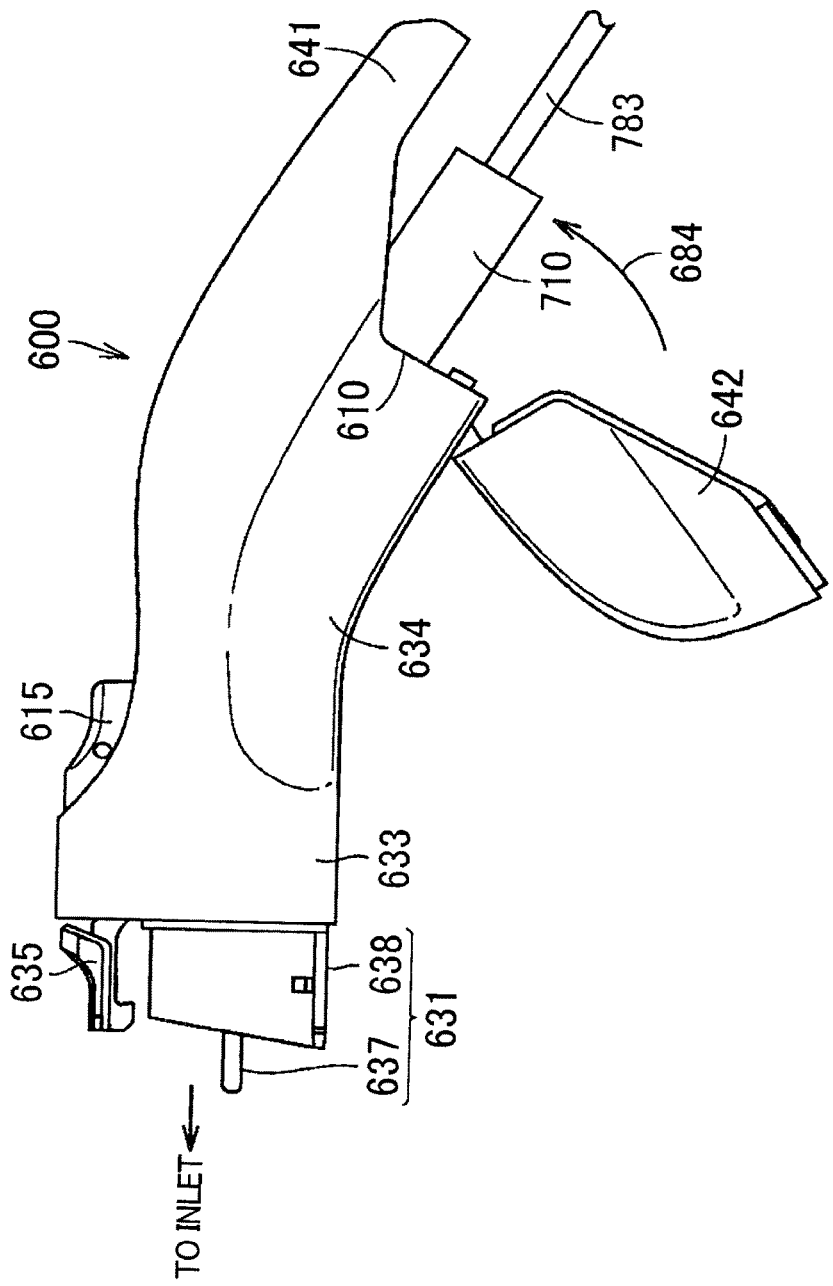
FIG. 2 is a side view of the power supply connector.

FIG. 2 is a side view of the power supply connector 600. In FIG. 2, the power supply connector 600 includes a main body portion 633 provided with a connecting portion 631, and a main body portion 634 provided with the socket 610.

The connecting portion 631 that is connected to the inlet 220 of the vehicle 100, and a pawl portion 635 provided to catch on a recess formed in the inlet 220 when the power supply connector 600 is attached to the inlet 220 are provided on one end of the main body portion 633. The main body portion 633 includes a rod-shaped member that extends in a horizontal direction. The operating member 615 for releasing an engagement between the pawl portion 635 and the inlet 220 is provided on an upper portion of the main body portion 633.

The connecting portion 631 has a shape that corresponds to the inlet 220 so that the connecting portion 631 can be fitted to the inlet 220. Further, by pressing the operating member 615, the catch between the pawl portion 635 and the recess formed in the inlet 220 is released, and as a result, the inlet 220 and the connecting portion 631 can be disconnected. In other words, a user can detach the power supply connector 600 from the vehicle 100 by pressing the operating member 615.

The main body portion 634 includes a rod-shaped member that extends in an inclined direction oriented downward from a horizontal plane. Note that the main body portion 634 may include a rod-shaped member that extends in a vertical direction. One end of the main body portion 634 is connected to the main body portion 633. The main body portion 633 and the main body portion 634 may be formed integrally or separately.

The socket 610 is provided on another end of the main body portion 634. A projecting portion 641 that projects in an extension direction of the main body portion 634 is formed on an upper side of a surface on which the socket 610 is provided. By forming the projecting portion 641, rainwater and the like can be prevented from adhering to the socket 610 when the power supply connector 600 is used outdoors in the rain.

Figure 3:
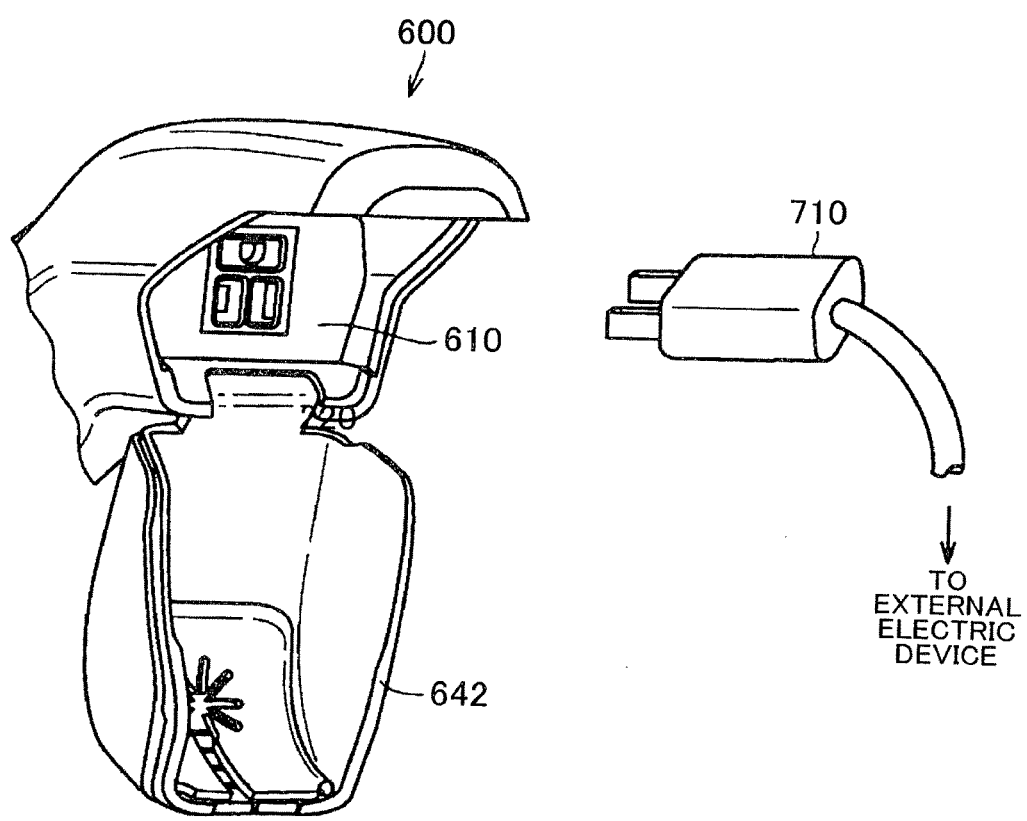
FIG. 3 is an enlarged view showing a part of the power supply connector into which a plug of the electric device is inserted.

The power supply connector 600 is provided with a cover 642 for protecting the surface provided with the socket 610 when the power supply connector 600 is not in use. As shown in FIG. 3, a rotary portion of the cover 642 is provided below the surface provided with the socket 610. The cover 642 is formed to be capable of rotating in a rotation direction 684 using the rotary portion as a rotary center. When an outer edge part of the cover 642 is rotated until the cover 642 contacts the projecting portion 641, the socket 610 is covered, and thus protected, by the cover 642.

Further, when the cover 642 of the power supply connector 600 is open, the socket 610 is exposed. A terminal hole to which the plug 710 of the electric device 700 can be connected is formed in the socket 610. The socket 610 has a similar shape to a socket disposed in a house or the like.

Figure 4:
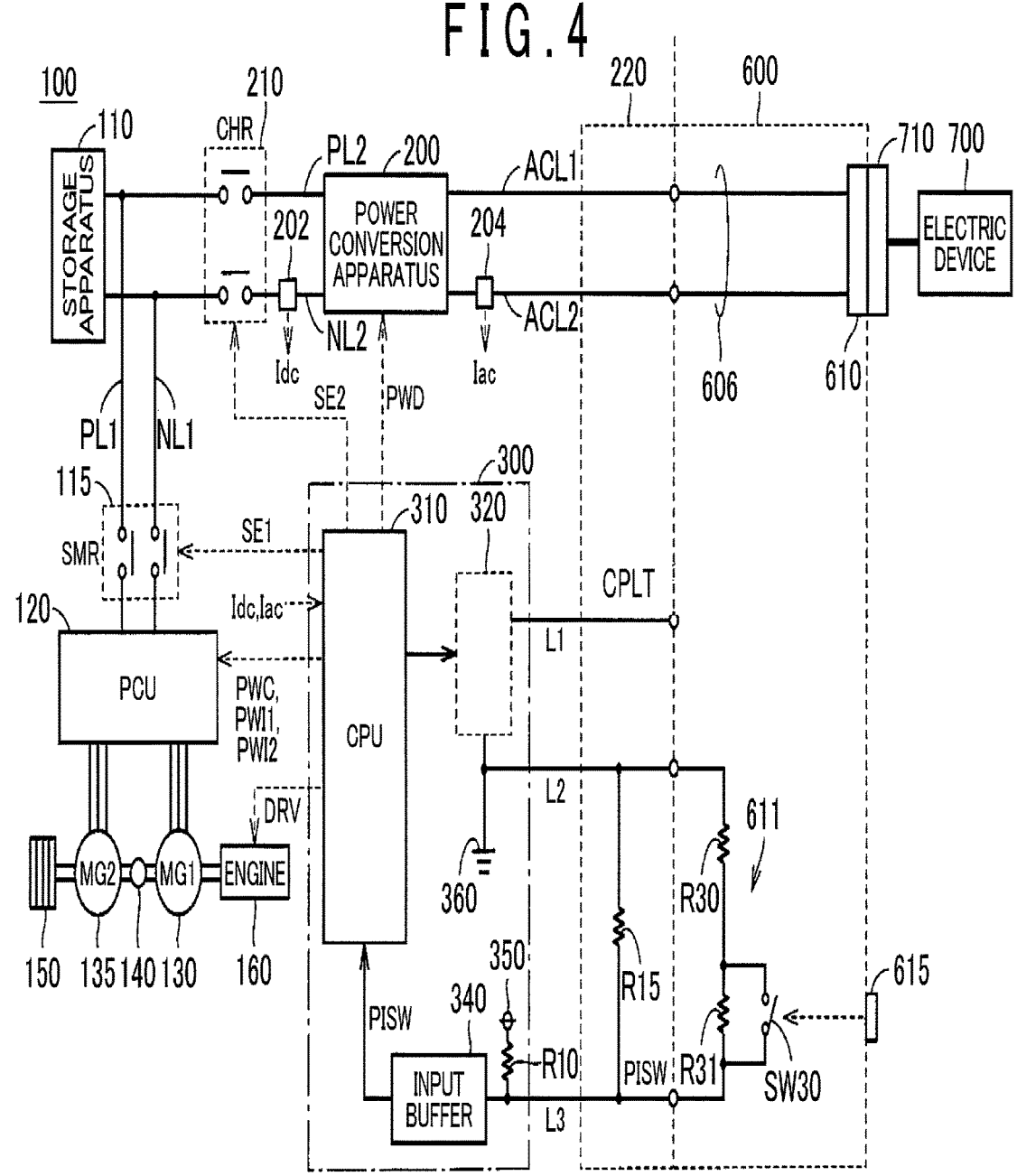
FIG. 4 is an overall block diagram of the vehicle according to this embodiment.

FIG. 4 is an overall block diagram of the vehicle 100 according to this embodiment. Referring to FIG. 4, the vehicle 100 includes a storage apparatus 110, a system main relay (SMR) 115, a power control unit (PCU) 120 serving as a driving apparatus, motor/generators 130, 135, a power transmission gear 140, a drive wheel 150, an engine 160 constituted by an internal combustion engine, a power conversion apparatus 200, a direct current (DC) current sensor 202, an alternating current (AC) current sensor 204, a charging relay (also referred to hereafter as a CHR) 210, the inlet 220, and an ECU 300 serving as a control apparatus.

The storage apparatus 110 is a chargeable/dischargeable power storage element. For example, the storage apparatus 110 is constituted by a secondary battery such as a lithium ion battery, a nickel hydrogen battery, or a lead storage battery, or a storage element such as an electric double layer capacitor.

The storage apparatus 110 is connected to the PCU 120 via a power line PL1 and a ground line NL1. The storage apparatus 110 supplies power for generating a driving force of the vehicle 100 to the PCU 120. Further, the storage apparatus 110 stores power generated by the motor/generators 130, 135. An output of the storage apparatus 110 is approximately 200 V, for example.

The storage apparatus 110 includes a voltage sensor, a current sensor, and a temperature sensor, none of which are shown in the drawings, and a voltage VB, a current IB, and a battery temperature TB of the storage apparatus 110, which are detected respectively by these sensors, are output to the ECU 300.

One relay included in the SMR 115 is connected to a positive electrode terminal of the storage apparatus 110 and the power line PL1 connected to the PCU 120, while another relay is connected to a negative electrode terminal of the storage apparatus 110 and the ground line NL1. The SMR 115 switches between supplying and cutting off power between the storage apparatus 110 and the PCU 120 on the basis of a control signal SE1 from the ECU 300.

The PCU 120 includes a converter that performs voltage conversion between the storage apparatus 110 and an inverter, to be described below, on the basis of a control signal PWC from the ECU 300, and the inverter that converts DC power supplied from the converter into AC power on the basis of control signals PWI1, PWI2 from the ECU 300 and drives the respective motor/generators 130, 135.

The motor/generators 130, 135 are AC rotating electric machines, for example permanent magnet synchronous motors including a rotor having an embedded permanent magnet.

An output torque of the motor/generators 130, 135 is transmitted to the drive wheel 150 via the power transmission gear 140, which includes a reduction gear and a power distribution mechanism, to cause the vehicle 100 to travel. When a regenerative braking operation is underway in the vehicle 100, the motor/generators 130, 135 are capable of generating power using a rotary force of the drive wheel 150. This generated power is converted by the PCU 120 into charging power for the storage apparatus 110.

Further, the motor/generators 130, 135 are joined to the engine 160 via the power transmission gear 140. The motor/generators 130, 135 and the engine 160 are operated cooperatively by the ECU 300 so that a required vehicle driving force is generated. Furthermore, the motor/generators 130, 135 can generate power using a rotation of the engine 160, and the storage apparatus 110 can be charged using the resulting generated power.

Note that in this embodiment, the motor/generator 135 is used exclusively as a motor for driving the drive wheel 150, while the motor/generator 130 is used exclusively as a power generation apparatus driven by the engine 160.

In the example shown in FIG. 1, two motor/generators are provided, but the number of motor/generators is not limited to two, and a single motor/generator or more than two motor/generators may be provided instead.

The vehicle 100 includes the power conversion apparatus 200, the charging relay 210 (to be referred to hereafter as the CHR 210), and the inlet 220 serving as a connecting portion as a configuration for charging the storage apparatus 110 using power from an external power supply 500, or supplying the power of the storage apparatus 110 or power generated by an MG1 to an external load.

For example, when the power supply connector 600 is connected to the inlet 220, a power supply operation is performed in the vehicle 100. When a charging connector (not shown) connected to an external power supply (a commercial power supply, for example) on the outside of the vehicle 100 is connected to the inlet 220, on the other hand, a charging operation is performed in the vehicle 100.

The power conversion apparatus 200 is connected to the inlet 220 via power lines ACL1, ACL2. Further, the power conversion apparatus 200 is connected to the storage apparatus 110 by a power line PL2 and a ground line NL2 via the CHR 210.

The power conversion apparatus 200 is controlled by a control signal PWD from the ECU 300 to convert AC power supplied from the inlet 220 into DC power for the storage apparatus 110, and to convert the DC power of the storage apparatus 110 or DC power generated by the motor/generators 130, 135 and converted by the PCU 120 into AC power and supply the AC power to an electric device on the outside of the vehicle 100.

The power conversion apparatus 200 may be a single apparatus capable of bidirectional power conversion for charging and supplying power, or may include individual apparatuses used respectively for charging and supplying power.

The CHR 210 is controlled by a control signal SE2 from the ECU 300 to switch between supplying and cutting off power between the power conversion apparatus 200 and the storage apparatus 110.

The DC current sensor 202 is provided on the ground line NL2 to detect a DC Idc of the ground line NL2. The DC current sensor 202 transmits a signal indicating the detected DC Idc to the ECU 300.

The AC current sensor 204 is provided on the ground line ACL2 to detect an AC Iac of the ground line ACL2. The AC current sensor 204 transmits a signal indicating the detected AC Iac to the ECU 300.

The ECU 300 includes a central processing unit (CPU) 310, a resistor circuit 320, an input buffer 340, and a storage device (not shown). The ECU 300 receives signals input from the respective sensors and so on, outputs control signals to the respective devices, and controls the storage apparatus 110 and the respective devices of the vehicle 100. Note that this control is not limited to software processing, and may be performed using dedicated hardware (electronic circuits).

The ECU 300 calculates a state of charge (SOC) of the storage apparatus 110 on the basis of detection values of the voltage VB, the current IB, and the battery temperature TB from the storage apparatus 110.

The ECU 300 estimates a catalyst temperature on the basis of conditions (for example, an intake air amount, a rotation speed, a throttle opening, a fuel injection amount, an ignition timing, an intake air temperature, and so on) of the engine 160. The ECU 300 may detect the catalyst temperature using a temperature sensor used in a catalyst, or the ECU 300 may estimate the catalyst temperature using a temperature sensor provided in the vicinity of the catalyst.

Note that in FIG. 4, a single control apparatus is provided as the ECU 300, but instead, an individual control apparatus may be provided for each function or each controlled device so that, for example, a control apparatus is provided for the PCU 120, a control apparatus is provided for the storage apparatus 110, and so on.

When the power supply connector 600 is connected to the inlet 220, the vehicle 100 side power lines ACL1, ACL2 and the socket 610 are electrically connected via a power transmission unit 606.

The power supply connector 600 further includes resistors R30, R31 and a switch SW30 constituting a connection detection circuit 611. When the power supply connector 600 is connected to the inlet 220, the resistors R30, R31 are connected in series between a connection signal line L3 and a ground line L2.

The switch SW30 is connected in parallel with the resistor R31. When the power supply connector 600 is fitted securely into the inlet 220, a contact of the switch SW30 is closed. When the power supply connector 600 is disconnected from the inlet 220 and when the power supply connector 600 and the inlet 220 are not securely fitted, the contact of the switch SW30 is open. The contact of the switch SW30 is also opened by operating the operating member 615.

When the power supply connector 600 is connected to the inlet 220, the CPU 310 is capable of determining a connection condition and a fitting condition of the power supply connector 600 using a combined resistance defined by a combination of resistors R10, R15, R30, R31.

Note that a resistance value of the connection detection circuit in the power supply connector 600 is set at a different value to a resistance value of a connection detection circuit provided in the charging connector used in the charging operation. Accordingly, a potential of a connection signal PISW generated when the power supply connector 600 is fitted takes a different value to the potential of the connection signal PISW generated when the charging connector is fitted. As a result, the CPU 310 can determine which of the charging connector and the power supply connector 600 is connected to the inlet 220 on the basis of the potential of the connection signal PISW.

After acknowledging on the basis of the potential of the connection signal PISW that the power supply connector 600 is connected, the CPU 310 closes the CHR 210 and controls the power conversion apparatus 200 to perform the power supply operation, whereby the power of the storage apparatus 110 is supplied to the external electric device 700.

The CPU 310 also drives the engine 160 to cause the motor/generator 130 to generate power, and supplies the generated power to the electric device 700.

The resistance values of the connection detection circuits provided respectively in the power supply connector 600 and the charging connector used in the charging operation are set to be different from each other. As a result, the CPU 310 can determine which of the charging connector and the power supply connector 600 is connected to the inlet 220.

The resistor circuit 320 is connected in series between a control pilot line L1 over which a pilot signal CPLT used in the charging operation is communicated, and a vehicle earth 360. The resistor circuit 320 is a circuit for manipulating a potential of the pilot signal CPLT from the vehicle 100 side.

A configuration in which the plug 710 of the external electric device 700 is connected to the power supply connector 600 was described above, but as shown in FIG. 5, a power supply cable 400A capable of transmitting power from a power supply connector 410A via a cable may also be used.

Figure 5:
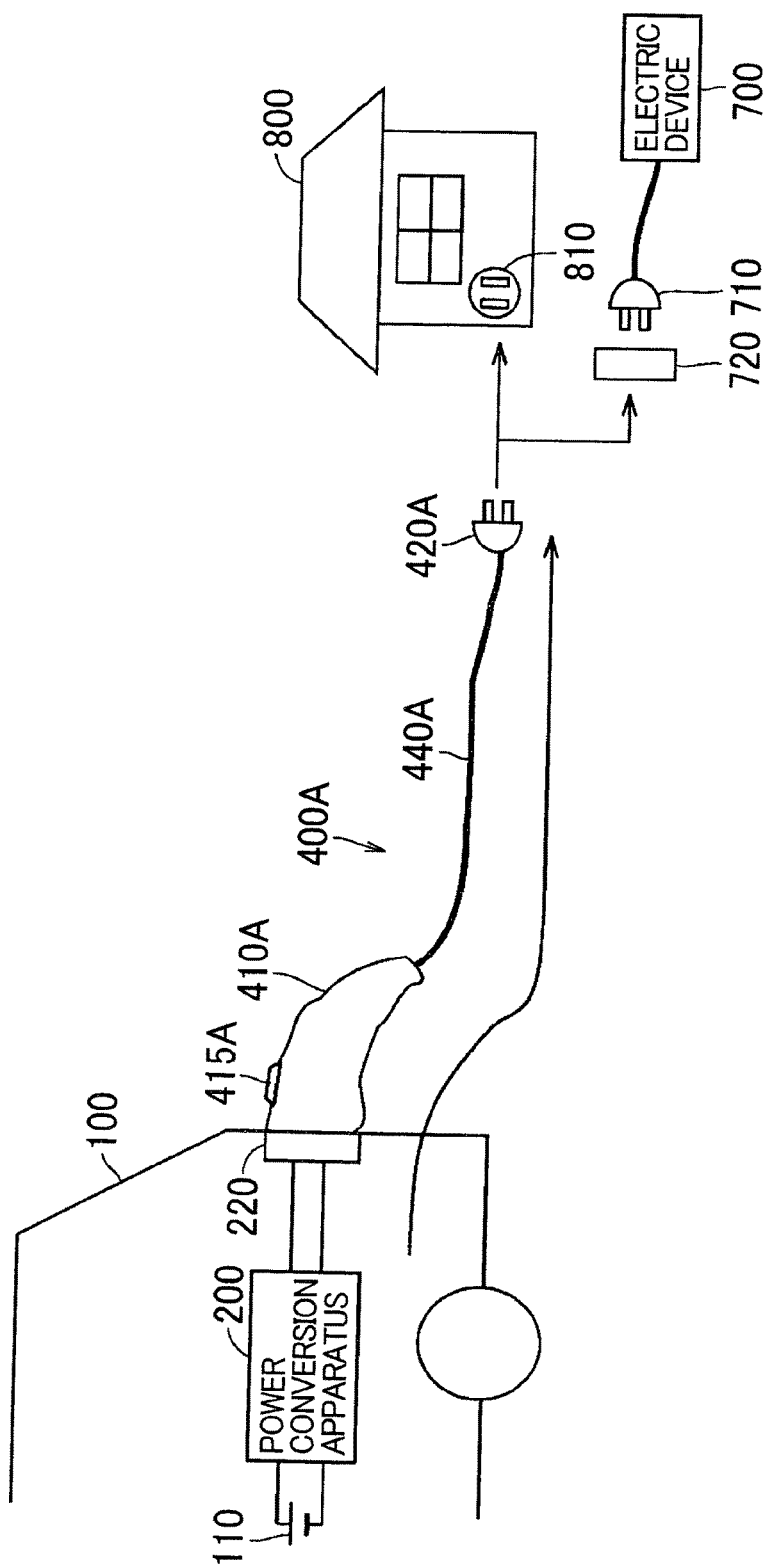
FIG. 5 is a view showing a first modified example of the power supply connector.

In the power supply cable 400A shown in FIG. 5, a plug 420A has a male type plug shape. By forming the plug 420A of the power supply cable 400A in this shape, power can be supplied to electric devices in a house 800 from the vehicle 100 when a power cut occurs in the house 800, for example, by connecting the plug 420A to an outlet 810 of the house 800. In this case, the house 800 serves as the power supply subject. Moreover, power can be supplied to the individual electric device 700 using an adaptor 720 capable of connecting the plug 420A of the power supply cable 400A and the plug 710 of the electric device 700. Note that the plug 420A may also have a female type plug shape.

Figure 6:
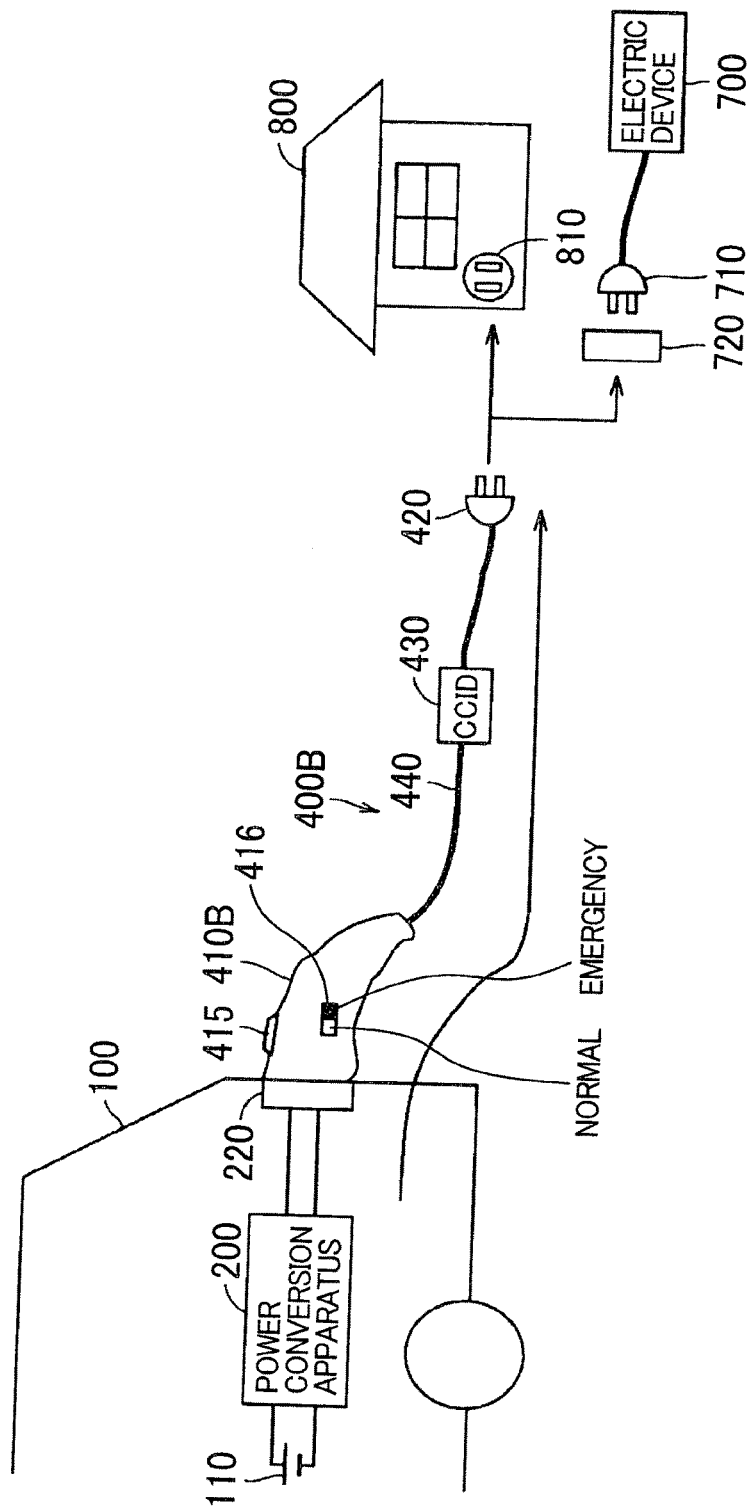
FIG. 6 is a view showing a second modified example of the power supply connector.

Alternatively, as shown in FIG. 6, a cable that is capable of switching between charging the storage apparatus 110 using an external power supply and supplying the power of the storage apparatus 110 or the power generated by the motor/generator 130 to the external electric device may be used.

A charging/power supply cable 400B shown in FIG. 6 is formed by replacing the power supply connector 410A of the power supply cable 400A illustrated in FIG. 5 with a charging/power supply connector 410B.

The charging/power supply connector 410B is provided with a switch 416 in addition to the configuration of the power supply connector 410A. The switch 416 is used to switch between the charging operation and the power supply operation, and by switching the switch 416 to "Emergency", the vehicle 100 is caused to perform the power supply operation to the outside while driving the engine to generate power. Further, by switching the switch 416 to "Normal", the vehicle 100 is caused to perform the charging operation. The switch between the charging operation and the power supply operation does not have to be performed manually, and may be performed by the vehicle 100 or by a power supply destination or a charging source (the house, for example).

In the vehicle configured as described above, the engine 160 may be driven in order to maintain the catalyst activation temperature even when an amount of power used by the electric device 700 serving as the power supply subject is small or the electric device 700 is temporarily stopped during an intermittent operation, and as a result, fuel may be consumed wastefully.

Hence, in this embodiment, when a power supply supplied to the electric device 700 serving as the power supply subject remains continuously smaller than a predetermined value during the power supply operation in which power is supplied to the electric device 700 from at least one of the motor/generator, 130 and the storage apparatus 110, the ECU 300 suppresses an operation of the engine 160.

More specifically, when the power supply remains smaller than the predetermined value continuously for more than a first time during the power supply operation, the ECU 300 stops the operation of the engine 160 or prohibits the engine 160 from operating. For example, in a case where the power supply remains smaller than the predetermined value continuously for more than the first time, the ECU 300 stops the operation of the engine 160 when the engine 160 is operative, and prohibits the engine 160 from operating when the engine 160 is stopped.

Further, when the power supply to the electric device 700 is equal to or larger than the predetermined value or when the duration of a condition in which the power supply is smaller than the predetermined value is equal to or shorter than the first time, the ECU 300 permits the engine 160 to operate.

For example, in a case where the power supply is equal to or larger than the predetermined value during the power supply operation or a case where the duration of a condition in which the power supply is smaller than the predetermined value is equal to or shorter than the first time during the power supply operation, the ECU 300 operates the engine 160 when the remaining capacity of the storage apparatus 110 falls below a threshold or the catalyst temperature of the engine 160 falls below a threshold.

Figure 7:
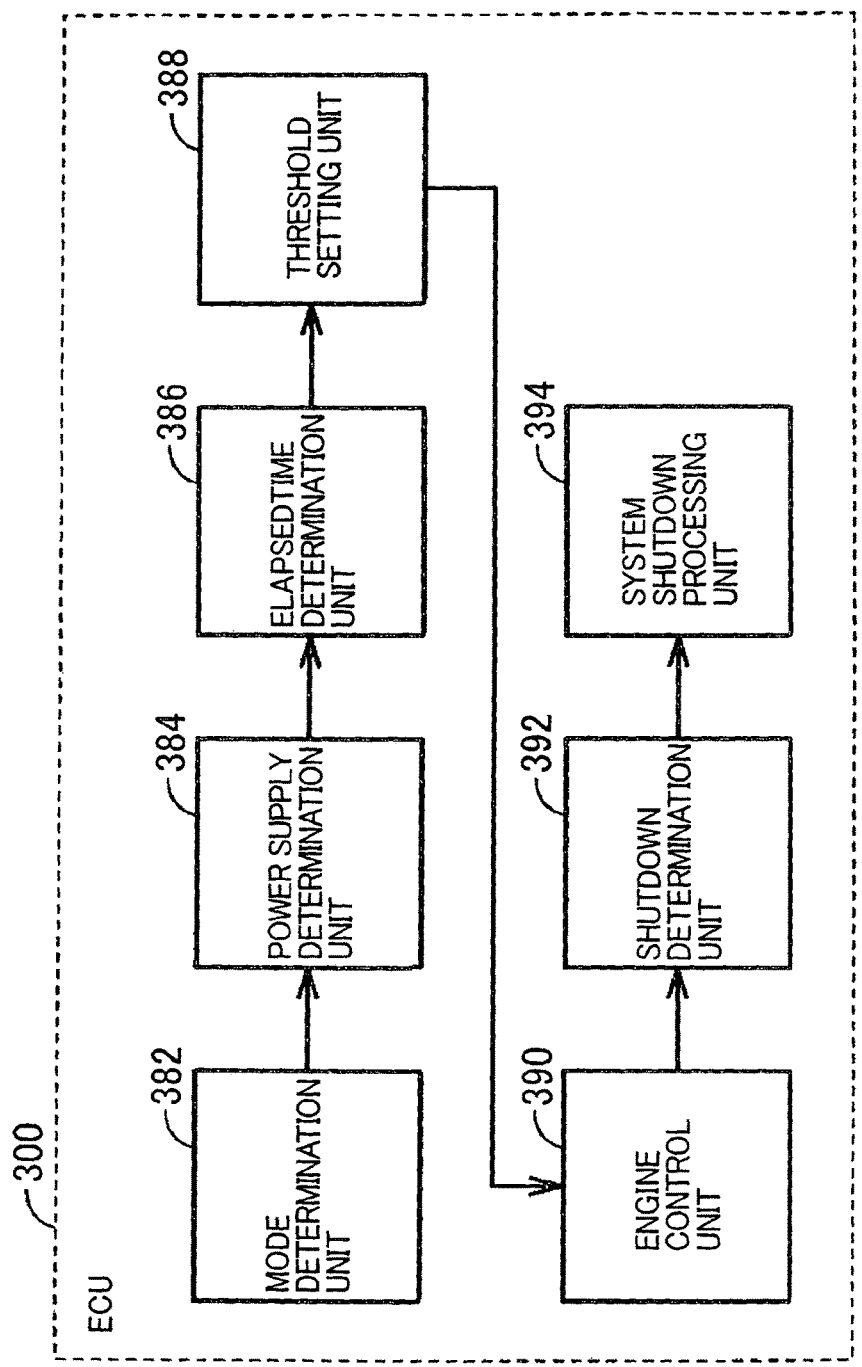
FIG. 7 is a block diagram showing functions of an electronic control unit (ECU) installed in the vehicle according to this embodiment.

FIG. 7 is a block diagram showing functions of the ECU 300 installed in the vehicle 100 according to this embodiment. The ECU 300 includes a mode determination unit 382, a power supply determination unit 384, an elapsed time determination unit 386, a threshold setting unit 388, an engine control unit 390, a shutdown determination unit 392, and a system shutdown processing unit 394.

The mode determination unit 382 determines whether or not a power supply mode is set. For example, the mode determination unit 382 may determine that the power supply mode is set when the power supply connector 600 is connected to the inlet 220. A method of determining whether or not the power supply connector 600 is connected to the inlet 220 was described above, and therefore detailed description thereof will not be repeated.

After determining that the power supply mode is set, the mode determination unit 382 may set a mode determination flag to ON, for example.

When the mode determination unit 382 determines that the power supply mode is set, the power supply determination unit 384 determines whether or not the power supply is stopped, or in other words whether or not the power supply is smaller than a predetermined value.

For example, the power supply determination unit 384 may determine that the power supply is stopped when a magnitude of a detection value of the DC Idc detected by the DC current sensor 202 is smaller than a threshold Idc (0).

Note that the threshold Idc (0) is a value for determining that the magnitude of the detection value of the DC Idc is substantially zero, which is set in consideration of detection errors and the like.

Alternatively, for example, the power supply determination unit 384 may determine that the power supply is stopped when a magnitude of an effective value of the AC Iac detected by the AC current sensor 204 is smaller than a threshold Iac (0). The power supply determination unit 384 calculates the magnitude of the effective value using a maximum value of a detection value of the AC Iac, for example. The threshold Iac (0) is a value for determining that the magnitude of the effective value of the AC Iac is substantially zero, which is set in consideration of detection errors and the like.

Alternatively, for example, the power supply determination unit 384 may determine that the power supply is stopped when a magnitude of the detection value of the current IB detected by the current sensor provided in the storage apparatus 110 is smaller than a threshold IB (0). The threshold IB (0) is set at a value at which the power supply to the electric device 700 can be determined to be smaller than the predetermined value, taking into consideration an amount of power consumed by accessories installed in the vehicle 100, an amount of power consumed by switching loss, and so on.

Alternatively, for example, the power supply determination unit 384 may calculate a reduction in the SOC of the storage apparatus 110 per predetermined time, and determine that the power supply is stopped when a magnitude $\Delta$SOC of the calculated reduction is smaller than a threshold $\Delta$SOC (0). $\Delta$SOC (0) is a value for determining that the reduction is substantially zero.

Alternatively, for example, the power supply determination unit 384 may determine that the power supply is stopped upon reception from the electric device 700 side (including the house) of information indicating that the electric device 700 is temporarily stopped during an intermittent operation or information indicating the power supply via the power supply connector, through wireless communication, or by another method.

The power supply determination unit 384 may determine that the power supply is stopped when the mode determination flag is ON, and after determining that the power supply is stopped, the power supply determination unit 384 may set a stoppage determination flag to ON.

Further, in a case where the power supply determination unit 384 determines whether or not the power supply is stopped by receiving information from the current sensor provided in the storage apparatus 110, information indicating the SOC of the storage apparatus 110, or information from the electric device 700 side, the DC current sensor 202 and the AC current sensor 204 may be omitted.

The elapsed time determination unit 386 determines whether or not a duration of a power supply stoppage has exceeded a predetermined first time. The first time is a threshold for determining whether or not the power supply remains stopped.

For example, the elapsed time determination unit 386 starts to measure the elapsed time (the duration of the power supply stoppage) using a timer or the like from the point at which the power supply is determined to be stopped. When the power supply operation is resumed during measurement of the elapsed time, the elapsed time determination unit 386 resets the elapsed time to an initial value, and when the power supply is subsequently determined to be stopped, the elapsed time determination unit 386 starts to measure the elapsed time again.

When the measured elapsed time exceeds the first time, the elapsed time determination unit 386 may set an elapse determination flag to ON, for example.

The threshold setting unit 388 sets an SOC threshold (to be referred to as a shutdown threshold hereafter) for executing system shutdown processing, to be described below, in accordance with whether or not the power supply remains stopped.

For example, the threshold setting unit 388 sets a threshold $\alpha$ as the shutdown threshold when the power supply is not stopped or the duration of the power supply stoppage has not exceeded the first time.

When the duration of the power supply stoppage has exceeded the first time, on the other hand, the threshold setting unit 388 sets a threshold $\beta$, for example, as the shutdown threshold. For example, the threshold setting unit 388 may set the threshold $\alpha$ as the shutdown threshold when the elapse determination flag is OFF and set the threshold $\beta$ as the shutdown threshold when the elapse determination flag is ON. Note that the threshold $\alpha$ takes a smaller value than the threshold $\beta$.

The engine control unit 390 controls the engine 160 in accordance with whether or not the power supply remains stopped. More specifically, the engine control unit 390 permits the engine 160 to operate when the power supply is not stopped or when the duration of the power supply stoppage has not exceeded the first time.

For example, in a case where the power supply is not stopped or the duration of the power supply stoppage has not exceeded the first time, the engine control unit 390 operates the engine 160 when the SOC of the storage apparatus 110 falls below an electric vehicle (EV) threshold.

The EV threshold is a value for determining whether or not to operate the engine when the power supply is not stopped (i.e. when power supply is underway), and is a larger value than the threshold $\beta$. In other words, the EV threshold is a threshold of the SOC of the storage apparatus 110 for determining during the power supply operation whether to supply the power of the storage apparatus 110 to the power supply subject or to operate the engine 160 in order to supply power generated by the motor/generator 130 to the power supply subject in addition to or instead of the power of the storage apparatus 110.

A value that enables the vehicle 100 to perform EV travel (travel using the motor/generator 135 while the engine 160 is stopped) for at least a predetermined distance following cancellation of the power supply mode, for example, is set as the EV threshold.

Note that the engine control unit 390 may operate the engine 160 in a case where the power supply is not stopped or the duration of the power supply stoppage has not exceeded the first time when the catalyst temperature of the engine 160 is smaller than a threshold, for example. The catalyst temperature threshold is set at a value at which the catalyst temperature can be determined to be within a catalyst activation temperature range. For example, the catalyst temperature threshold may be set at a lower limit value of the catalyst activation temperature range or a value that is higher than the lower limit value by a predetermined value.

Further, for example, the engine control unit 390 may permit the engine 160 to operate when the elapse determination flag is OFF.

When the duration of the power supply stoppage has exceeded the first time, on the other hand, the engine control unit 390 stops the operation of the engine 160 or prohibits the engine 160 from operating, for example. For example, the engine control unit 390 stops the operation of the engine 160 when the engine 160 is operative and prohibits the engine 160 from operating when the engine 160, is stopped.

While the operation of the engine 160 is stopped or the engine 160 is prohibited from operating, the engine control unit 390 does not operate the engine 160 even when the catalyst temperature falls below the threshold, for example.

Further, for example, the engine control unit 390 may stop the operation of the engine 160 or prohibit the engine 160 from operating when the elapse determination flag is ON.

The shutdown determination unit 392 determines whether or not the SOC of the storage apparatus 110 has fallen to or below the shutdown threshold. When the power supply is not stopped or when the duration of the power supply stoppage does not exceed the first time, the shutdown determination unit 392 determines whether or not the SOC of the storage apparatus 110 has fallen to or below the threshold α. For example, the shutdown determination unit 392 may determine whether or not the SOC of the storage apparatus 110 has fallen to or below the threshold α when the elapse determination flag is OFF.

When the duration of the power supply stoppage exceeds the first time, for example, the shutdown determination unit 392 determines whether or not the SOC of the storage apparatus 110 has fallen to or below the threshold β. For example, the shutdown determination unit 392 may determine whether or not the SOC of the storage apparatus 110 has fallen to or below the threshold β when the elapse determination flag is ON.

After determining that the SOC of the storage apparatus 110 has fallen to or below the shutdown threshold, the shutdown determination unit 392 may set a shutdown determination flag to ON, for example.

Further, when the SOC of the storage apparatus 110 is larger than the shutdown threshold, for example, the shutdown determination unit 392 determines whether or not the duration of the power supply stoppage exceeds a predetermined second time. There are no particular limitations on the second time providing it is longer than the first time.

For example, the shutdown determination unit 392 may set the shutdown determination flag to ON when the duration of the power supply stoppage is determined to have exceeded the second time, even in a case where the SOC of the storage apparatus 110 is larger than the shutdown threshold.

The system shutdown processing unit 394 executes the system shutdown processing on the basis of a determination result obtained by the shutdown determination unit 392. For example, the system shutdown processing unit 394 executes the system shutdown processing when the shutdown determination unit 392 determines that the SOC of the storage apparatus 110 has fallen to or below the shutdown threshold or when the duration of the power supply stoppage is determined to have exceeded the second time.

The system shutdown processing unit 394 executes processing for stopping a system of the vehicle 100 that is activated during the power supply operation as the system shutdown processing. For example, the system shutdown processing unit 394 sets the CHR 210 in a shutdown condition. Note that as long as the system shutdown processing unit 394 can stop the system of the vehicle 100 that is activated during the power supply operation, the system shutdown processing unit 394 is not limited to setting the CHR 210 in the shutdown condition. For example, the system shutdown processing unit 394 may control the power conversion apparatus 200 to stop the power supply operation.

Further, the system shutdown processing unit 394 may execute the system shutdown processing when, for example, the shutdown determination flag is ON.

In this embodiment, the mode determination unit 382, the power supply determination unit 384, the elapsed time determination unit 386, the threshold setting unit 388, the engine control unit 390, the shutdown determination unit 392, and the system shutdown processing unit 394 all function as software that is realized by having the CPU 310 of the ECU 300 execute a program stored in the storage device. However, these units may be realized by hardware. Note that the program is recorded on a storage medium and installed in the vehicle.

Figure 8:
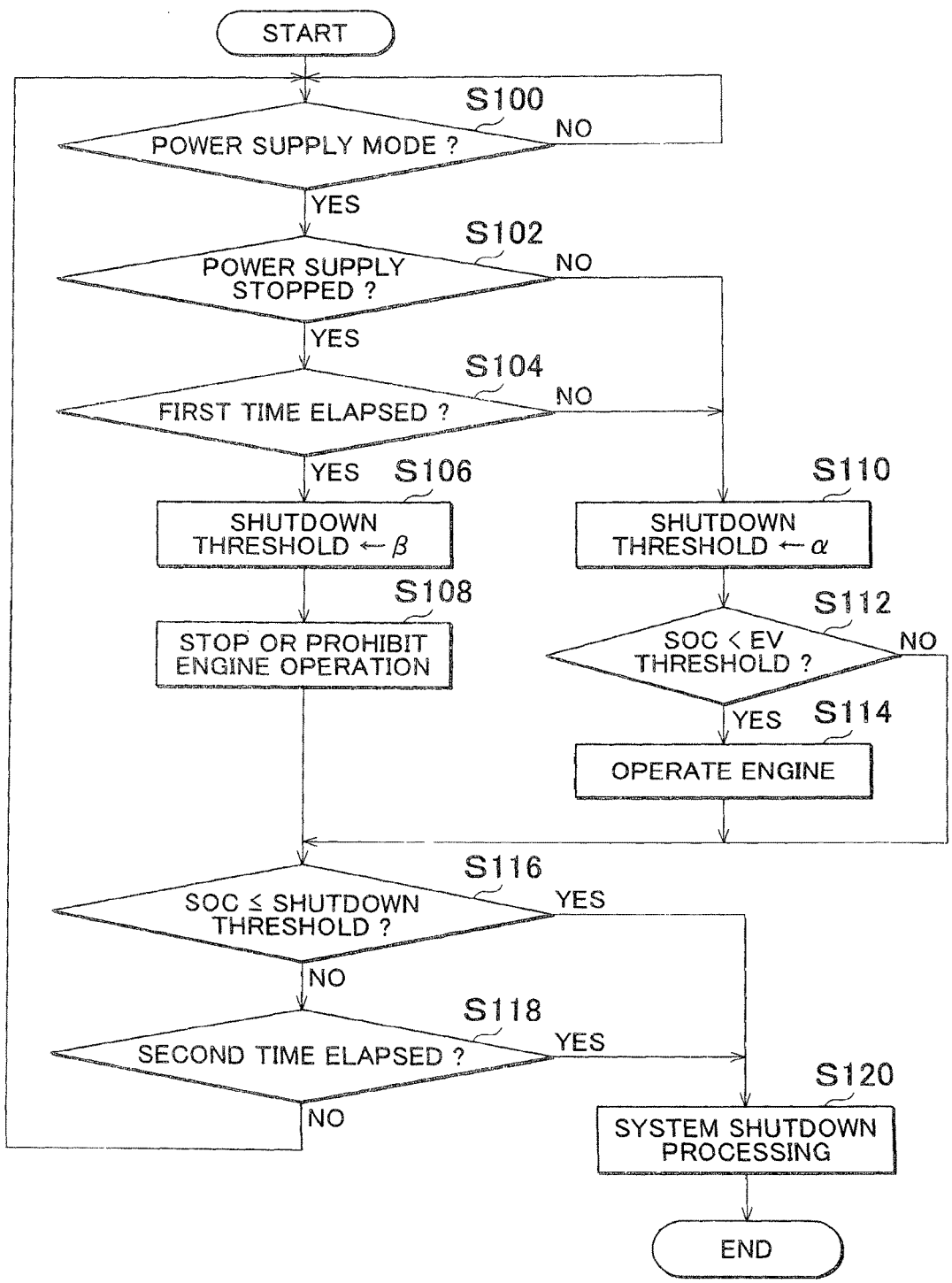
FIG. 8 is a flowchart showing a control structure of a program executed by the ECU installed in the vehicle according to this embodiment.

Referring to FIG. 8, a control structure of the program executed by the ECU 300 installed in the vehicle 100 according to this embodiment will now be described.

In Step (to be abbreviated to S hereafter) 100, the ECU 300 determines whether or not the power supply mode is set. When it is determined that the power supply mode is set (YES in S100), the processing advances to S102. Otherwise (NO in S100), the processing returns to S100.

In S102, the ECU 300 determines whether or not the power supply is stopped. When it is determined that the power supply is stopped (YES in S102), the processing advances to S104. Otherwise (NO in S102), the processing advances to S110.

Note that a method of determining whether or not the power supply mode is set and a method of determining whether or not the power supply is stopped were described above, and therefore detailed description thereof will not be repeated.

In S104, the ECU 300 determines whether or not the duration of the power supply stoppage exceeds the first time. When it is determined that the duration of the power supply stoppage exceeds the first time (YES in S104), the processing advances to S106. Otherwise (NO in S104), the processing advances to S110.

In S106, the ECU 300 sets the threshold β as the shutdown threshold. In S108, the ECU 300 stops the operation of the engine 160 or prohibits the engine 160 from operating. In S110, the ECU 300 sets the threshold α as the shutdown threshold.

In S112, the ECU 300 determines whether or not the SOC of the storage apparatus 110 is smaller than the EV threshold. When it is determined that the SOC of the storage apparatus 110 is smaller than the EV threshold (YES in S112), the processing advances to S114. Otherwise (NO in S112), the processing advances to S116.

In S114, the ECU 300 operates the engine 160. When the engine 160 is operative, the ECU 300 maintains the operation.

In S116, the ECU 300 determines whether or not the SOC of the storage apparatus 110 has fallen to or below the shutdown threshold. When it is determined that the SOC of the storage apparatus 110 has fallen to or below the shutdown threshold (YES in S116), the processing advances to S120. Otherwise (NO in S116), the processing advances to S118.

In S118, the ECU 300 determines whether or not the duration of the power supply stoppage exceeds the second time. When it is determined that the duration of the power supply stoppage exceeds the second time (YES in S118), the processing advances to S120. Otherwise (NO in S118), the processing returns to S100.

In S120, the ECU 300 executes the system shutdown processing. The system shutdown processing was described above, and therefore detailed description thereof will not be repeated.

An operation of the ECU 300 installed in the vehicle according to this embodiment, based on the above structure and flowchart, will now be described.

For example, when the power supply connector 600 is attached to the inlet 220 of the vehicle 100 and the plug 710 of the electric device 700 is connected to the power supply connector 600, the power supply operation is performed in the vehicle 100 (YES in S100).

More specifically, the CHR 210 is switched ON (to a conductive condition) such that the DC power of the storage apparatus 110 is converted into AC power by the power conversion apparatus 200, and the converted AC power is supplied to the electric device 700 via the inlet 220, the power supply connector 600, and the plug 710.

When the electric device 700 is temporarily stopped during an intermittent operation or the like such that the power supply is stopped (YES in S102) and the duration of the power supply stoppage exceeds the first time (YES in S104), the threshold β is set as the shutdown threshold (S106) and the operation of the engine 160 is stopped or the engine 160 is prohibited from operating (S108).

Hence, when the engine 160 is operative, the engine 160 is stopped, and when the engine 160 is stopped, the engine 160 is prohibited from operating. The operation of the engine 160 is likewise suppressed when, for example, the catalyst temperature falls below the activation temperature while the engine 160 is stopped.

When the SOC of the storage apparatus 110 falls to or below the shutdown threshold (here, the threshold β) due to power consumption by the electric device 700 (YES in S116), the system shutdown processing is executed (S120), whereby the CHR 210 is switched OFF (to a shutdown condition).

In a case where the duration of the power supply stoppage exceeds the second time (S118), the system shutdown processing is executed (S120) even when the SOC of the storage apparatus 110 is larger than the shutdown threshold (NO in S116).

When the power supply is not stopped (NO in S102) or the power supply is stopped (YES in S102) but the duration of the power supply stoppage does not exceed the first time (NO in S104), on the other hand, the threshold α is set as the shutdown threshold (S110).

In this case, the engine 160 is operated (S114) when the SOC of the storage apparatus 110 is smaller than the EV threshold (YES in S112).

When the SOC of the storage apparatus 110 falls to or below the shutdown threshold (here, the threshold α) (YES in S116), the system shutdown processing is executed (S120), whereby the CHR 210 is switched OFF (to the shutdown condition).

In a case where the duration of the power supply stoppage exceeds the second time (S118), the system shutdown processing is executed (S120) even when the SOC of the storage apparatus 110 is larger than the shutdown threshold (NO in S116).

With the vehicle according to this embodiment, as described above, when the power supply remains smaller than the predetermined value continuously for more than the first time during the power supply operation for supplying power from the vehicle 100 to the power supply subject, the operation of the engine 160 is stopped or the engine 160 is prohibited from operating. Accordingly, the engine 160 is not operated even when an operation of the engine 160 is requested due to a reduction in the catalyst temperature or the like in a case where the electric device 700 is temporarily stopped during an intermittent power supply operation or the like. As a result, wasteful fuel consumption can be avoided. Furthermore, a wasteful operation of the engine 160 can be avoided, and therefore an increase in exhaust gas emissions into the air around the vehicle can be suppressed. It is therefore possible to provide a vehicle and a control method for the vehicle with which the engine is controlled appropriately in accordance with the operating conditions of the power supply destination.

Moreover, when the power supply is stopped, power is consumed only by the accessories of the vehicle 100 and by switching loss and the like occurring in the power generation apparatus, and therefore the power consumption is suppressed. Stand-by is therefore possible for a long time until an operation of the electric device 700 is resumed using the storage apparatus 110 alone without stopping the system of the vehicle 100 that is operated during the power supply operation.

Further, when the duration of the power supply stoppage exceeds the second time, the system of the vehicle 100 that is activated during the power supply operation is stopped, whereby a reduction in the SOC can be suppressed. As a result, a situation in which the power supply mode is selected and then left so that the vehicle 100 cannot perform EV travel subsequently due to a reduction in the SOC can be avoided.

The embodiments disclosed herein are entirely exemplary, and are not intended to be limiting. The scope of the invention is defined by the claims rather than the above description, and includes all modifications equivalent in meaning to the claims and within the scope thereof.

The invention claimed is:

1. A vehicle comprising:
   an engine;
   an auxiliary system;
   a storage apparatus capable of supplying power to a power supply subject outside the vehicle;
   a power generation apparatus configure to supply power to the power supply subject using the engine as a power source; and
   an electronic control unit configured to operate the engine during a power supply operation in which power is supplied to the power supply subject from at least one of the power generation apparatus and the storage apparatus, the electronic control unit being configured to stop the engine when a duration of time in which a power supply is smaller than a predetermined value exceeds a first time, and the power supply being the power supplied to the power supply subject during the power supply operation, and the electronic control unit being configured to stop the auxiliary system of the vehicle that is activated during the power supply operation when the duration of time exceeds a second time, and the second time being longer than the first time.

2. The vehicle according to claim 1, wherein the electronic control unit is configured to stop the operation of the engine or prohibit the engine from operating when the duration exceeds the first time.

3. The vehicle according to claim 2, wherein the electronic control unit is configured to permit the engine to operate when the power supply is equal to or larger than the predetermined value or when the duration is equal to or shorter than the first time.

4. The vehicle according to claim 3, wherein, in a case where the power supply is equal to or larger than the predetermined value or a case where the duration is equal to or shorter than the first time, the electronic control unit is configured to permit the engine to operate when a remaining capacity of the storage apparatus falls below a threshold.

5. The vehicle according to claim 3, wherein, in a case where the power supply is equal to or larger than the predetermined value or a case where the duration is equal to or shorter than the first time, the electronic control unit is configured to permit the engine to operate when a catalyst temperature of the engine falls below a threshold.

6. A control method for a vehicle including an engine, an auxiliary system, a storage apparatus, a power generation apparatus, and an electronic control unit, the control method comprising:
- operating, by the electronic control unit, the engine during a power supply operation in which power is supplied to a power supply subject outside the vehicle from at least one of the power generation apparatus and the storage apparatus, the power generation apparatus supplying power to the power supply subject using the engine as a power source, and the storage apparatus supplying power to the power supply subject,
- stopping, by the electronic control unit, an operation of the engine when a duration of time in which a power supply is smaller than a predetermined value exceeds a first time, the power supply being the power supplied to the power supply subject during the power supply operation; and
- stopping, by the electronic control unit, the auxiliary system of the vehicle that is activated during the power supply operation when the duration of time exceeds a second time, wherein the second time is longer than the first time.

* * * * *